Sept. 18, 1934.        G. E. EDMUNDS        1,974,018
WHEEL MOUNTING
Filed July 20, 1931        3 Sheets-Sheet 1
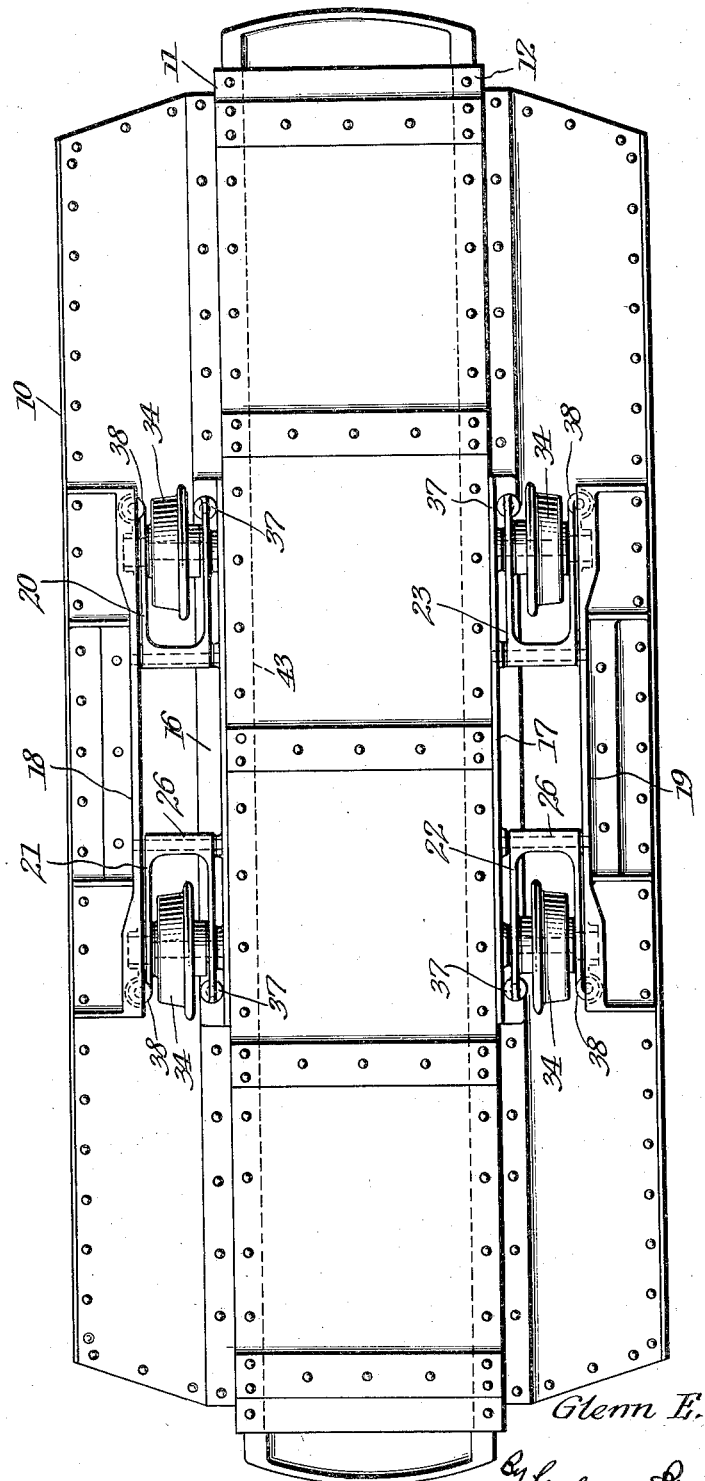

Sept. 18, 1934.  G. E. EDMUNDS  1,974,018
WHEEL MOUNTING
Filed July 20, 1931  3 Sheets-Sheet 2
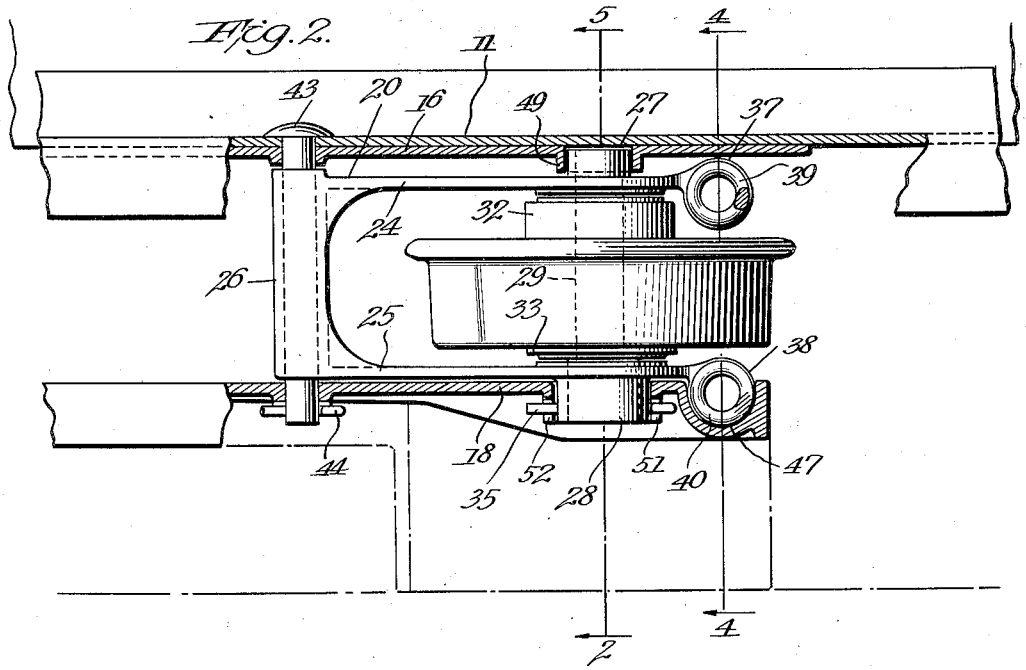
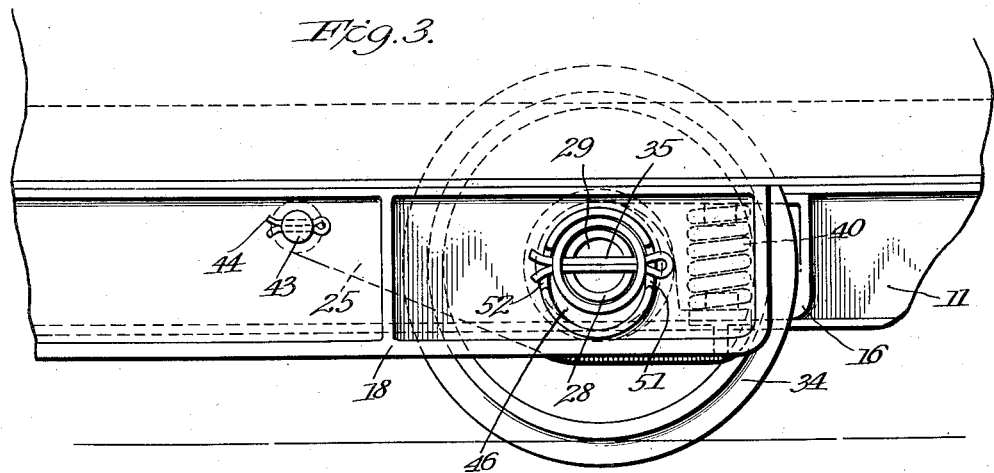
Inventor
Glenn E. Edmunds
By Cushman, Bryant Darby
Attorneys Sept. 18, 1934. G. E. EDMUNDS 1,974,018
WHEEL MOUNTING
Filed July 20, 1931 3 Sheets-Sheet 3
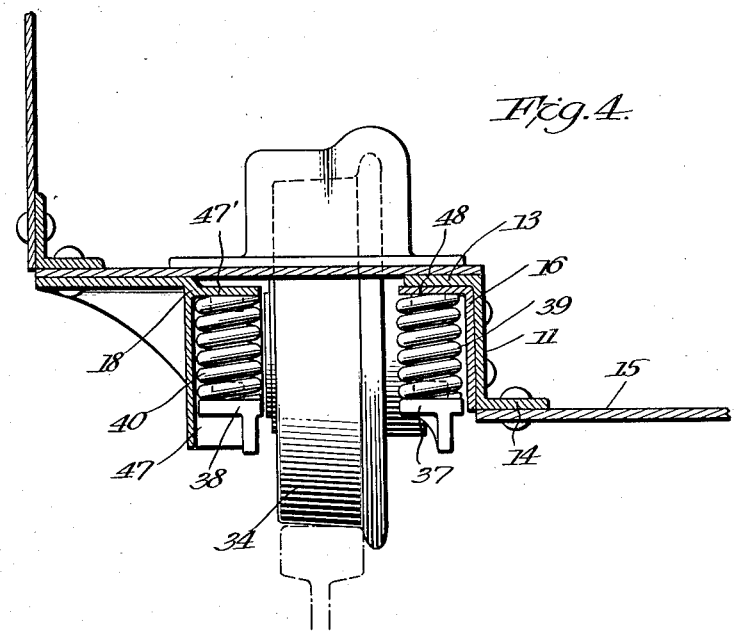
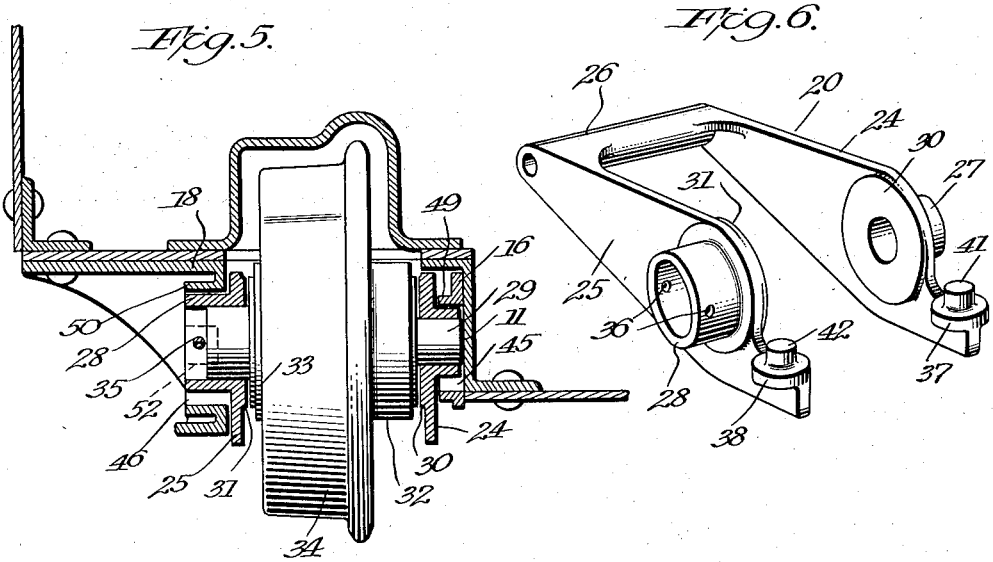
Inventor.
Glenn E. Edmunds Patented Sept. 18, 1934

1,974,018

UNITED STATES PATENT OFFICE 1,974,018

WHEEL MOUNTING

Glenn E. Edmunds, Columbus, Ohio, assignor to The Bonney-Floyd Company, Columbus, Ohio, a corporation of Ohio Application July 20, 1931, Serial No. 552,000

12 Claims. (Cl. 105—218)

The present invention relates to wheel mounting means for wheel supported transport means or vehicles. In its broad aspect, the invention contemplates the provision of a lever pivoted to the vehicle structure and providing, remote from its pivoting axis, journal support for a wheel, spring means being interposed between the vehicle body and lever in such a manner as to tend to move the lever and wheel downwardly. The invention is particularly applicable to track-mounted cars, such as mine cars, affording exceptional stability to such cars under movement and insuring the engagement of all of the car wheels with the track so as to prevent accidental derailment.

According to the embodiment of the invention to be hereinafter described, one or more of the wheels of a car, and desirably, all of them, are mounted in pivoted, spring-influenced yokes supported and guided by the car structure. The invention is particularly applicable to large cars of stiff construction, or to any cars of such rigid structure that their frames do not accommodate themselves to track unevenness, so that all the wheels may at all times engage the rails.

In the accompanying drawings:—

Figure 1 is a bottom plan view of a mine car of relatively large size and rigid construction provided with wheel mountings according to the present invention.

Figure 2 is a plan view, with parts in section, of the structure shown in Figure 3.

Figure 3 is an enlarged view in elevation of a portion of the car shown in Figure 1.

Figure 4 is a section on line 4—4 of Figure 2.

Figure 5 is a section on line 5—5 of Figure 2; and

Figure 6 is a perspective of a wheel mounting yoke.

Referring to the drawings, reference numeral 10 designates a mine car which comprises an underframe embodying the sills 11 and 12 in the form of Z-bars with outwardly directed top webs as at 13, Figure 4, and inwardly directed bottom webs as at 14, the bottom webs being connected by a floor plate 15.

Inner side frames 16 and 17 are secured to the outer sides of the sills beneath their top webs and outer side frames 18 and 19 are rigidly supported in parallel relation to the inner side frames 16 and 17 respectively.

Between the inner and outer side frames are mounted the wheel carrying yokes 20, 21 22 and 23. Since the construction of all the yokes and their mounting means are identical, a description of one will suffice and reference will be had to yoke 20 which is shown in Figures 2 to 6.

Yoke 20 comprises a pair of parallel arms or bars 24 and 25 whose top and bottom edges are converged to an integral tubular cross portion 26. Adjacent their free ends the arms are provided with outwardly extending bosses 27 and 28 which have aligned bores in which a stub axle 29 is engaged. The arms are inwardly thickened surrounding the wheel receiving apertures as at 30 and 31 to provide thrust surfaces for the hub portions 32 and 33 of a flanged wheel 34 which is mounted on the axle. The axle is restrained against outward movement through boss 28 by means of a cotter pin 35 passed through diametrically opposite bores 36 in the boss.

The lower portions of the arms 24 and 25 are continued to form seats 37 and 38 adapted to engage the lower ends of compression springs 39 and 40, the seats being provided with central lugs 41 and 42 for positioning the springs. The yoke 20 is mounted between the side frames 16 and 18 on a bolt 43 passed through the side frames and also through the sill 11, the bolt being held in place by a cotter pin 44. The yoke arms extend longitudinally of the side frames and the latter are provided with vertically extending openings 45 and 46 for the reception of the bosses 27 and 28, the openings being of such size and shape as to permit vertical movements of the bosses in the arcuate paths determined by the pivot bolts 43, the ends of the openings serving as abutments for the bosses whereby movements of the bosses in both directions are positively limited. Spring seat 38, as most clearly shown in Figure 2, is outwardly offset from arm 25 and the side frame 18 is provided with an offset vertically extending pocket 47 for the reception of the seat and spring 40, the spring seating at its upper end against a seat 47' integral with the side frame at the top of the pocket. Spring 39 engages a seat 48 at the top of side frame 16.

Apertures 45 and 46 are collared as shown at 49 and 50, the collar 50 being interrupted as at 51 and 52 to accommodate the cotter pin 35 and permit its free movement with boss 28.

The yoke itself is of rigid construction and further is in guided contact with inner portions of the side frames so that it is not liable to distortion. It will be noted that due to the disposition of the axle closely adjacent the springs, the latter take the main portion of the weight. The strength of the springs is so chosen that they will be at least somewhat compressed when the car is empty so that when any one wheel, for example, comes above a track depression, it will be immediately moved downwardly under the action of its associated springs, all the wheels being thus maintained constantly in engagement with the rails. The top abutment portions of the side frames may rest on the yoke bosses when the car is loaded, since, as applied to a car of the type shown and described, the present invention is not so much concerned with the spring suspension of the car load as it is in providing spring means for urging the wheels downwardly when they tend to lift off of the rails. If desired, however, the spring may be designed for load suspension and yet be partially compressed under the weight of the empty car so that, with the car empty, ample downward movement of the wheels relative to the car frame will be permitted.

It is evident that with a car embodying the stub axle construction shown and described, each wheel is independent of the others and is adapted to move up and down with its axis on the horizontal and constantly parallel to the swinging axis of its mounting yoke. In other words, the wheel axis is never tilted relative to the car structure and effective rail engagement is assured.

It will be understood that I do not limit myself to the exact structure and application of the invention shown and described, since many modifications and applications are possible without departure from the scope of the invention as determined in the following claims.

I claim:—

1. In a vehicle comprising a side frame, a wheel mounting comprising an arm pivotally connected to the side frame and extending in the longitudinal direction of the latter, a wheel rotatably supported by said arm remote from its pivot point, a spring interposed between the arm and side frame and tending to move the arm and wheel downwardly, said side frame having a vertically extending opening intermediate the ends of the arm, and a boss on said arm projecting into said opening for abutment with the end walls of the latter to limit oscillatory movements of said arm.

2. In a vehicle comprising a side frame, a wheel mounting comprising an arm pivotally connected to the side frame and extending in the longitudinal direction of the latter, a laterally projecting boss on said arm remote from the pivot point and apertured transversely of the arm, an axle received in the boss aperture, a wheel mounted on said axle, and a spring interposed between the arm and side frame tending to move the arm and wheel downwardly, said side frame having a vertically extending opening into which said boss projects for abutment with the end walls of the opening to limit oscillatory movements of said arm.

3. In a vehicle comprising a side frame, a wheel mounting comprising an arm pivotally connected at one end to the side frame and extending in the longitudinal direction of the latter, a laterally projecting boss adjacent the free end of said arm and having an aperture extending transversely of the arm, an axle received in the boss aperture, a wheel mounted on said axle, lower and upper opposed spring seats on the free end of said arm and on the side frame respectively, and a compression spring engaged between said seats, the side frame having a vertically extending opening into which said boss projects for abutment with the end walls of the opening to limit oscillatory movements of said arm.

4. In a vehicle comprising a pair of parallel side frames, a wheel mounting comprising a yoke disposed between the side frames and extending longitudinally of the latter, said yoke comprising a pair of parallel arms and a tubular transverse portion joining said arms at one end of the latter, a pivot member passed through said tubular transverse portion and engaged in apertures in said side frames, the yoke being oscillable about said pivot member with said arms in guided contact with the inner surfaces of said side frames, a stub axle extending between and supported by said arms remote from and parallel to said pivot member, a wheel mounted on said axle, and spring means interposed between the free end of the yoke and side frames and tending to move the yoke and wheel downwardly.

5. In a vehicle comprising a pair of parallel side frames, a wheel mounting comprising a yoke disposed between the side frames and extending longitudinally of the latter, said yoke comprising a pair of parallel arms and a tubular transverse portion joining said arms at one end of the latter, a pivot member passed through said tubular transverse portion and engaged in apertures in said side frames, the yoke being oscillable about said pivot member with said arms in guided contact with the inner surfaces of said side frames, a stub axle extending between and supported by said arms remote from and parallel to said pivot member, a wheel mounted on said axle, spring means interposed between the free end of the yoke and side frames and tending to move the yoke and wheel downwardly, and means to limit the downward movement of the yoke.

6. In a vehicle comprising a pair of parallel side frames, a wheel mounting comprising a yoke disposed between the side frames and extending longitudinally of the latter, said yoke comprising a pair of parallel arms and a tubular transverse portion joining said arms at one end of the latter, a pivot member passed through said tubular transverse portion and engaged in apertures in said side frames, the yoke being oscillable about said pivot member with said arms in guided contact with the inner surfaces of said side frames, a stub axle extending between and supported by said arms remote from and parallel to said pivot member, a wheel mounted on said axle, spring means interposed between the free end of the yoke and side frames and tending to move the yoke and wheel downwardly, and means to limit the movement of the yoke upwardly against the force of said spring means.

7. In a vehicle comprising a pair of parallel side frames, a wheel mounting comprising a yoke disposed between the side frames and extending longitudinally of the latter, said yoke comprising a pair of parallel arms and a tubular transverse portion joining said arms at one end of the latter, a pivot member passed through said tubular transverse portion and engaged in apertures in said side frames, the yoke being oscillable about said pivot member with said arms in guided contact with the inner surface of said side frames, a stub axle extending between and supported by said arms remote from and parallel to said pivot member, a wheel mounted on said axle, spring means interposed between the free end of the yoke and side frames and tending to move the yoke and wheel downwardly, and means to limit oscillatory movements of the yoke in both directions about its pivot.

8. In a vehicle comprising a pair of parallel side frames, a wheel mounting comprising a yoke disposed between the side frames and extending longitudinally of the latter, said yoke comprising a pair of parallel arms and a tubular transverse portion joining said arms at one end of the latter, a pivot member passed through said tubular transverse portion and engaged in apertures in said side frames, the yoke being oscillable about said pivot member with said arms in guided contact with the inner surfaces of said side frames, a stub axle extending between and supported by said arms remote from and parallel to said pivot member, a wheel mounted on said axle, and spring means interposed between the free end of the yoke and side frames and tending to move the yoke and wheel downwardly, said arms having laterally extending bosses engaged in vertically extending openings in the respective side frames and abutting the ends of said openings to limit oscillatory movements of said yoke in either direction.

9. In a vehicle, a pair of parallel side frames, a wheel mounting comprising a yoke disposed between the side frames and extending longitudinally of the latter, said yoke comprising a pair of parallel arms joined at one end by a tubular transverse portion, a pivot member passed through said tubular transverse portion and engaged in apertures in said side frames, the yoke being oscillable about said pivot member with said arms in guided contact with the inner surfaces of said side frames, outwardly projecting bosses on said arms adjacent their free ends engaged in vertically extending openings in said side frames and abutting the ends of said openings to limit oscillatory movements of said yoke in either direction, a stub axle engaged in aligned bores in said bosses, and spring means interposed between the free end of the yoke and said side frames and tending to move the yoke and wheel downwardly.

10. In a vehicle, a pair of parallel side frames, a wheel mounting comprising a yoke disposed between the side frames and extending longitudinally of the latter, said yoke comprising a pair of parallel arms joined at one end by a tubular transverse portion, a pivot member passed through said tubular transverse portion and engaged in apertures in said side frames, the yoke being oscillable about said pivot member with said arms in guided contact with the inner surfaces of said side frames, outwardly projecting bosses on said arms adjacent their free ends engaged in vertically extending openings in said side frames and abutting the ends of said openings to limit oscillatory movements of said yoke in either direction, a stub axle engaged in aligned bores in said bosses, upper and lower opposed spring seats formed on the side frames and arm ends respectively, and compression springs engaged between said opposed seats.

11. A wheel-mounting yoke comprising a pair of parallel arms joined at one end by a tubular transverse portion, said arms being provided with axle-receiving apertures adjacent their free ends aligned on an axis parallel to the axis of said transverse tubular portion, outwardly extending cylindrical bosses on said arms co-axial with the axis of said apertures, and spring seats at the free ends of said arms.

12. A wheel-mounting yoke comprising a pair of parallel arms joined at one end by a tubular transverse portion, said arms being provided with axle-receiving apertures adjacent their free ends aligned on an axis parallel to the axis of said transverse tubular portion, outwardly extending cylindrical bosses on said arms co-axial with the axis of said apertures, inwardly thickened portions on said arms and surrounding said apertures, and spring seats at the free ends of said arms.

GLENN E. EDMUNDS.